June 20, 1961  V. B. HONSINGER  2,989,655
TWO SPEED SYNCHRONOUS MOTOR
Filed Nov. 2, 1959  2 Sheets-Sheet 1
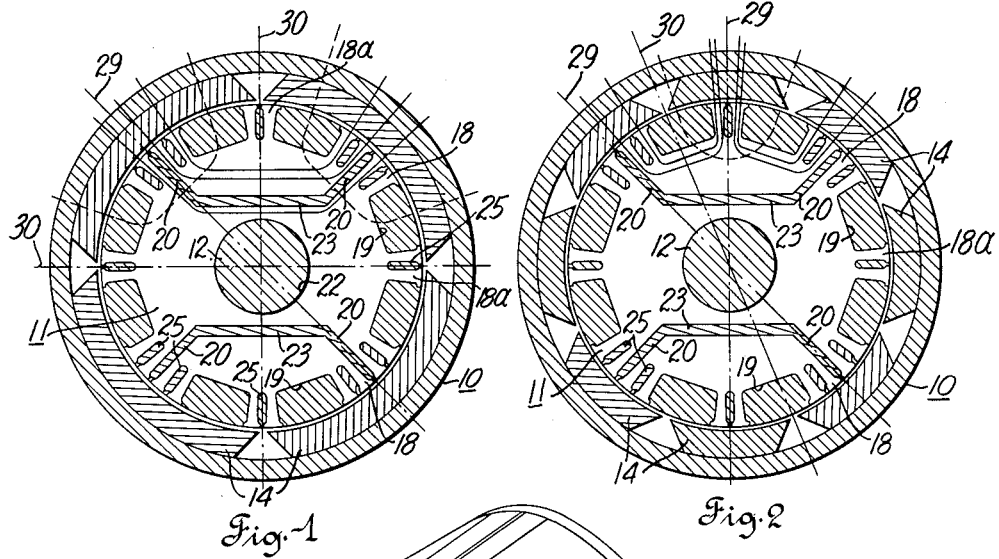
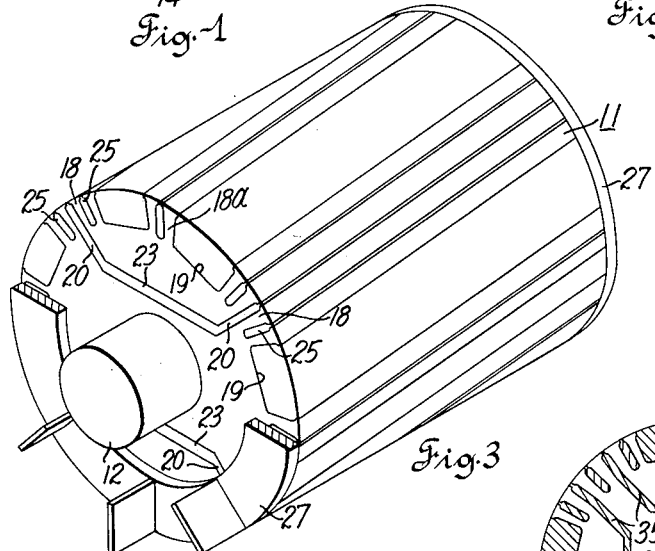
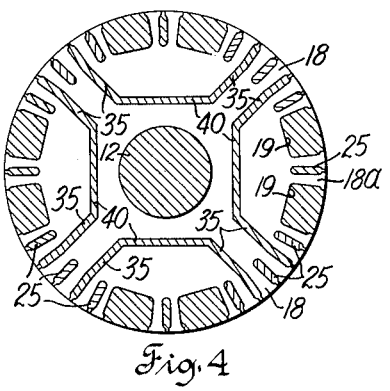
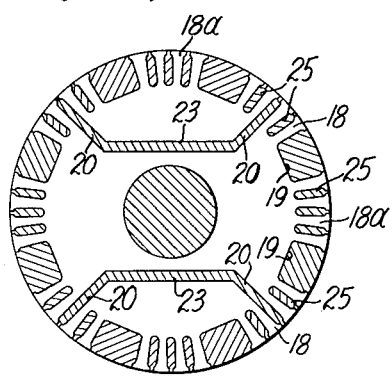
Inventor
Vernon B. Honsinger
by Robert B. Benson
Attorney June 20, 1961  V. B. HONSINGER  2,989,655
TWO SPEED SYNCHRONOUS MOTOR
Filed Nov. 2, 1959  2 Sheets-Sheet 2

Inventor
Vernon B. Honsinger
by Robert B. Benson
Attorney

United States Patent Office 2,989,655
Patented June 20, 1961

2,989,655
TWO SPEED SYNCHRONOUS MOTOR
Vernon B. Honsinger, Cincinnati, Ohio, assignor to Allis-Chalmers Manufacturing Company, Milwaukee, Wis.
Filed Nov. 2, 1959, Ser. No. 850,403
6 Claims. (Cl. 310—211)

This application relates generally to synchronous motors. More specifically, this application relates to two speed synchronous motors of the reluctance type.

In the power transmission field there is a great demand for multispeed motors that maintain a very accurate speed. One such motor is a synchronous motor provided with means for varying the frequency of the input current to thereby vary the speed of the motor. However, most places requiring a motor drive do not have facilities for varying the frequency input to the motors. Another way of getting a range or speed from a synchronous motor is to provide the motor with a gear train or a set of sheaves connected to its output shaft. The speed range obtainable from these drives are somewhat limited and the equipment required for such a drive is cumbersome and expensive. Furthermore, the bulky equipment is frequently too large for use in certain applications. Another drawback to these arrangements is that many complicated accessories are required to vary the speed.

The motor of this invention overcomes some of the problems of the prior art by providing a simple motor that can run at two different synchronous speeds. The speed of the motor can be changed by merely changing the terminal connections on the stator. Furthermore, the motor can easily be combined with the standard gear and sheave sets to double the speed range usually obtained from these sets when combined with a standard synchronous motor.

Therefore, it is the object of this invention to provide an improved synchronous motor.

Another object of this invention is to provide a new and improved motor that will operate at two distinct synchronous speeds.

Another object of this invention is to provide a new and improved synchronous induction motor that will accelerate to full speed as an induction motor and will run as a synchronous motor at two different speeds.

Other objects and advantages of this motor will be apparent when reading the following description in conjunction with the accompanying drawings in which:

FIG. 1 is a cross sectional view of the preferred embodiment of the motor connected to operate as a four pole synchronous motor;

FIG. 2 is a cross sectional view of the preferred embodiment of the motor connected to operate as an eight pole synchronous motor;

FIG. 3 is a pictorial view of the rotor with parts removed;

FIG. 4 is a view of a modified rotor lamination in which alternate salient poles have two radial dividing slots; and FIG. 5 is a view of a modified form of the rotor lamination of FIG. 1 in which all of the salient poles are of equal size.

Figure 6:
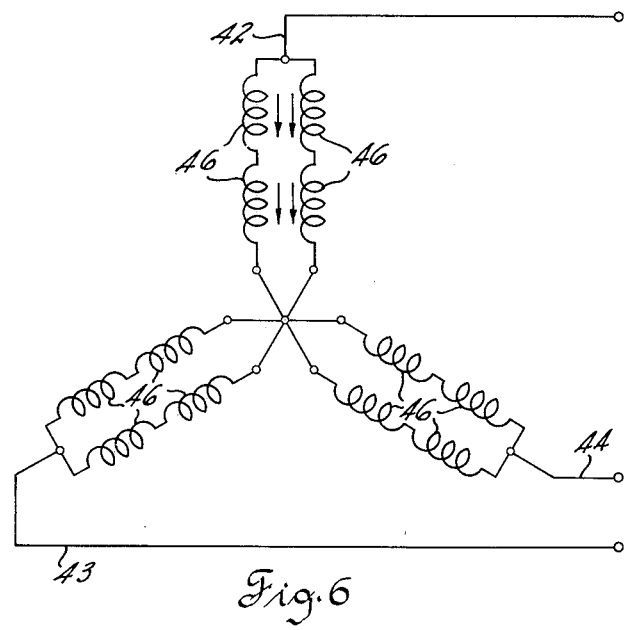
FIG. 6 is a schematic showing of the rotor winding hooked up to provide 4 rotating poles.

As shown in the drawings, the two speed synchronous motor 10 of this invention comprises a cylindrical rotor 11 mounted on a shaft 12 and positioned within a stator 13 for rotation relative thereto. The stator 13 is of the type normally used in induction motors except that a single winding is provided with an extra set of connectors so that the stator may be connected up to selectively provide two sets of rotating poles or else the stator is provided with two or more windings each arranged to provide different numbers of rotating poles. The stator and two sets of rotating poles 14 are schematically illustrated in FIGS. 1 and 2 as having four poles (FIG. 1) and eight poles (FIG. 2). In describing the invention the stator will be referred to as having four poles or eight poles for the purpose of illustration but it is obvious to people skilled in the art that the stator could have any even number of poles in one set and twice that number of poles in the second set.

Figure 7:
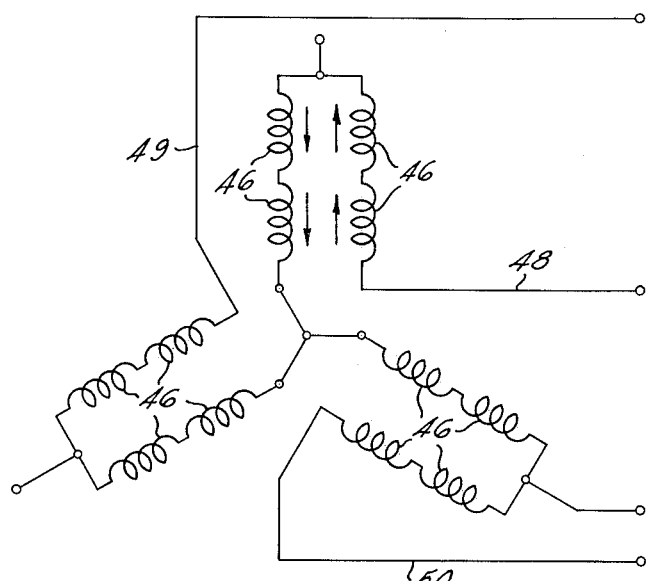
FIG. 7 is a schematic diagram illustrating how the winding of FIG. 6 is hooked up to provide 8 rotating poles in the stator.

FIGS. 6 and 7 will be recognized by those skilled in the art as a connection diagram for a two speed, variable torque, induction motor winding. In the 4 pole operation, as shown in FIG. 6, the leads 42, 43 and 44 are connected to a voltage source so that current in adjacent coil groups 46 on the stator periphery flows in opposite directions. This provides four spaced apart rotating magnetic poles with adjacent poles being of opposite polarity. On the other hand, in the eight pole operation, as shown in FIG. 7, the leads 48, 49 and 50 are connected to a voltage source so that current in adjacent coil groups 46 on the stator periphery flows in the same direction. This provides four spaced apart rotating magnetic poles of the same polarity and the space intermediate the poles takes on the aspects of an opposite pole as a consequence of the flux produced by the current flowing through the groups of coils. The eight pole connection is known as a consequent pole winding.

The rotor 11 consists of a magnetic core 17 which is preferably laminated. The rotor core 17 has a plurality of salient poles 18, 18a equal to the largest number of poles formed in the stator. The salient poles are separated by axially extending grooves 19 and can be classified as primary poles 18 and secondary poles 18a. The primary poles 18 are those that lock in with the rotating poles on the stator when the motor is operating at either four or eight poles. The secondary poles 18a are those that lock in with the rotating poles on the stator only when the motor is operating as an eight pole machine. The size of the salient poles 18, 18a and the size of the grooves 19 separating adjacent salient poles is determined by the particular performance characteristics desired in the motor. Generally speaking, the primary poles 18 are larger than the secondary poles 18a, although in certain instances it may be desirable to have them both the same size such as illustrated in FIG. 5.

As shown in FIGS. 1-3, the primary salient poles 18 are divided by a slot 20 extending from the periphery of the rotary radially inward to near the central bore 22. The radially inner portion of each slot 20 is connected to a slot 20 in an adjacent primary pole by suitable means such as the connecting slot 23. The slots 20 and 23 serve to divide the rotor into magnetically isolated segments and act as flux barriers to quadrature axis flux.

The poles 18, 18a are also provided with induction motor winding slots 25. Preferably, the slots 20, 23 and 25 and the grooves 19 are filled with a nonmagnetic electrically conducting material and interconnected at the ends of the rotor such as by rings 27 to form a squirrel cage winding. Hence, the motor will have the good starting characteristics of a squirrel cage induction motor. The slots 25 and 20 and the grooves 19 may be skewed as shown in FIG. 3 to improve the induction motor characteristics of the motor. The rotor structure is especially well adapted to being die cast with aluminum.

The secondary poles 18a are similar to the salient poles of a standard reluctance motor. In a reluctance type motor the pullout torque is a function of the direct axis reactance and the quadrature axis reactance of the motor.

When the stator winding is connected to provide four poles, the direct axis 29 in this motor 10 is aligned with the primary salient poles 18 and the quadrature axis 30 is ninety electrical degrees removed from the direct axis. The pullout torque (PO) is proportional to a constant (K) times the difference between the reciprocal of the quadrature axis reactance $x_q$ and the reciprocal of the direct axis reactance $x_d$.

$$PO = K\left(\frac{1}{x_q} - \frac{1}{x_d}\right)$$

To obtain a maximum pullout torque for the motor, the quadrature axis reactance must be reduced to a minimum while maintaining the direct axis reactance near its maximum. The reactance is proportional to the flux. Therefore, to approach a minimum quadrature axis reactance quadrature axis flux must be reduced to a minimum. The quadrature axis flux of a rotor can be reduced by increasing the reluctance in the flux path.

When operating as an eight pole motor such as in FIG. 2, the direct axis 29 passes through the centerline of primary salient poles 18 as well as secondary salient poles 18a and the quadrature axis passes midway between these poles. The motor runs at synchronous speed on a pure reluctance principle. In this arrangement the radial slots 20 and the connecting slots 23 have very little effect on the operation of the motor because they do not oppose the quadrature axis flux and do not substantially interfere with the direct axis flux.

On the other hand, when the motor is operating as a four pole machine such as shown in FIG. 1 the secondary salient poles 18a appear midway between the primary poles and are directly aligned with the quadrature axis 30. This physical structure provides a good magnetic path in the quadrature axis which is contrary to the theory of eliminating quadrature axis flux to improve the torque characteristics of the motor. Therefore, the radial slots 20 and connecting slots 23 are provided in the primary poles and in the interior of the rotor core 17 to act as flux carriers to the quadrature axis flux. Furthermore, the axially extending grooves 19 on either side of the secondary poles 18a although not ideally located relative to the quadrature axis also provide a flux barrier to the quadrature axis flux. It follows therefore that the width of the radial slots 20 and the connecting slot 23 should be wide enough to substantially eliminate the quadrature axis flux of the motor that bypasses the grooves 19. When operating as a four pole machine the motor is similar in design and operation, except for the secondary poles 18a, to the motor illustrated and described in U.S. Patent 2,733,632, P. F. Bauer and V. B. Honsinger, issued January 31, 1956.

The width or arcuate expanse of the grooves 19 will be determined by the width or arcuate expanse of the salient poles. However, the grooves are designed to reduce to a minimum the quadrature axis flux. Therefore the depth of the grooves 19 is preferably sufficient to substantially minimize the quadrature axis flux throughout the expanse of the groove.

The flux patterns when the motor is operating as a four pole machine are illustrated in FIG. 1 and the flux pattern when the motor is operating as an eight pole machine is shown in FIG. 2. The direct axis or useful flux is shown in solid lines and the quadrature axis flux is shown in broken lines. It can be seen from these figures that when the motor is operating as a four pole machine the axially extending grooves 19 and the slots 20, 23 all act as useful flux barriers whereas when operating as an eight pole machine only the slots 19 are useful flux barriers.

A second embodiment of this invention is illustrated by the lamination shown in FIG. 4 in which the primary poles 18 are provided with two radial dividing slots 35 per pole. Each radial dividing slot 35 is connected to a radial dividing slot 35 in an adjacent primary pole by suitable means such as the slot 40.

The lamination illustrated in FIG. 5 is a variation of the rotor lamination illustrated in FIG. 1. In the lamination illustrated in FIG. 5 all of the salient poles are of the same size.

Although but three embodiments have been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A motor comprising a stator, means for selectively providing said stator with two different sets of rotating field poles, a rotor mounted on a shaft and positioned within said stator, said rotor having a plurality of arcuately spaced salient poles separated by axially extending grooves, said poles having winding slots near their periphery, said slots being filled with an electrically conducting material and interconnected at the ends of the rotor to form a cylindrical rotor having a squirrel cage winding.

2. A motor comprising a stator means for selectively providing said stator with two different sets of rotating field poles, a rotor positioned within said stator and mounted on a shaft for rotation therewith, said rotor having a plurality of arcuately spaced salient poles separated by axially extending grooves, said poles having winding slots near their periphery, only the alternate poles having a dividing slot extending inward from the periphery of said rotor, said slots and grooves being filled with a nonmagnetic electrically conducting material and interconnected at the ends of the rotor to form a squirrel cage winding.

3. A motor comprising a stator means for selectively providing said stator with two different sets of rotating field poles, a rotor positioned with said stator and mounted on a shaft for rotation therewith, said rotor having a plurality of arcuately spaced salient poles separated by axially extending grooves, said poles having winding slots near their periphery, only the alternate poles having a dividing slot extending radially inward from the periphery of said rotor, the radially inner end of each of said dividing slots being connected to the radially inner end of a dividing slot in an adjacent pole, said slots and grooves being filled with a nonmagnetic electrically conducting material and interconnected at the ends of the rotor to form a squirrel cage winding.

4. A motor comprising a stator, means for selectively providing said stator with two different sets of rotating poles, a rotor positioned within said stator and mounted on a shaft for rotation therewith, said rotor having a plurality of arcuately spaced salient poles separated by axially extending grooves, only the alternate poles having a pair of dividing slots extending radially inward from the periphery of said rotor, the radially inner end of each of said dividing slots being connected to the radially inner end of a dividing slot in an alternate pole, said slots and grooves being filled with a nonmagnetic electrically conducting material and interconnected at the ends of the rotor to form a squirrel cage winding.

5. A rotor for a synchronous induction motor comprising: a core having a plurality of arcuately spaced salient poles separated by axially extending grooves, said poles having winding slots near their periphery, only the alternate poles having a dividing slot extending radially inward from the periphery of said rotor, the radially inner end of each of said dividing slots being connected to the radially inner end of a dividing slot in an adjacent alternate pole, said slots being filled with a nonmagnetic electrically conducting material and interconnected at the ends of the rotor to form a squirrel cage winding.

6. A rotor for a synchronous induction motor comprising: a plurality of arcuately spaced salient poles separated by axially extending grooves, only the alternate poles having a pair of dividing slots extending radially inward from the periphery of said rotor, the radially inner end of each of said dividing slots being connected to the radially inner end of a dividing slot in an alternate pole, said slots being filled with a nonmagnetic electrically conducting material and interconnected at the ends of the rotor to form a squirrel cage winding.

References Cited in the file of this patent

UNITED STATES PATENTS

| | | |
|---|---|---|
| 2,671,879 | Schwarz | Mar. 9, 1954 |
| 2,733,362 | Bauer et al. | Jan. 31, 1956 |
| 2,769,108 | Risch | Oct. 30, 1956 |
| 2,913,607 | Douglas et al. | Nov. 17, 1959 |